March 18, 1958     C. S. McCHESNEY     2,826,993
FLEXIBLE HOSE FLUID PUMP

Filed Nov. 23, 1953     3 Sheets-Sheet 1

INVENTOR.
CUYLER S. McCHESNEY
BY
Benj. T. Rauber
ATTORNEY

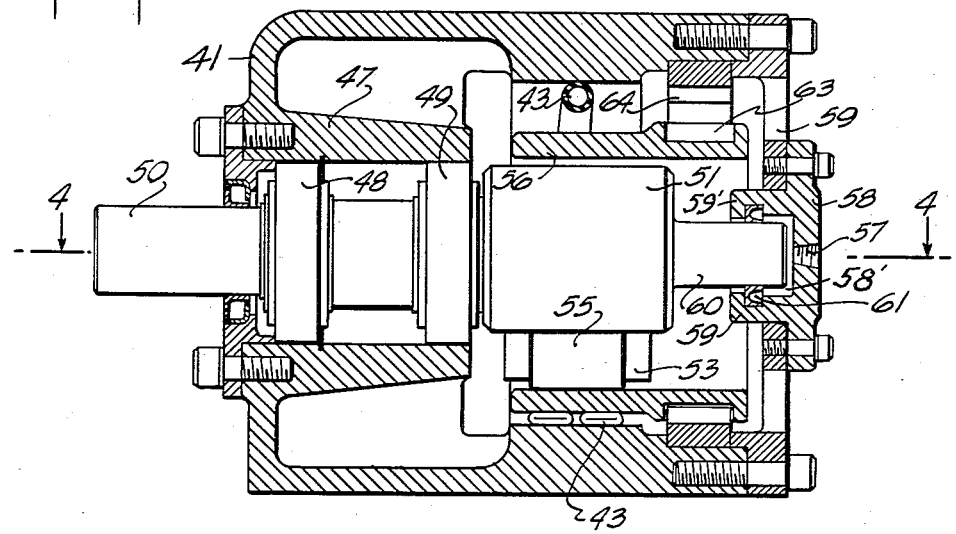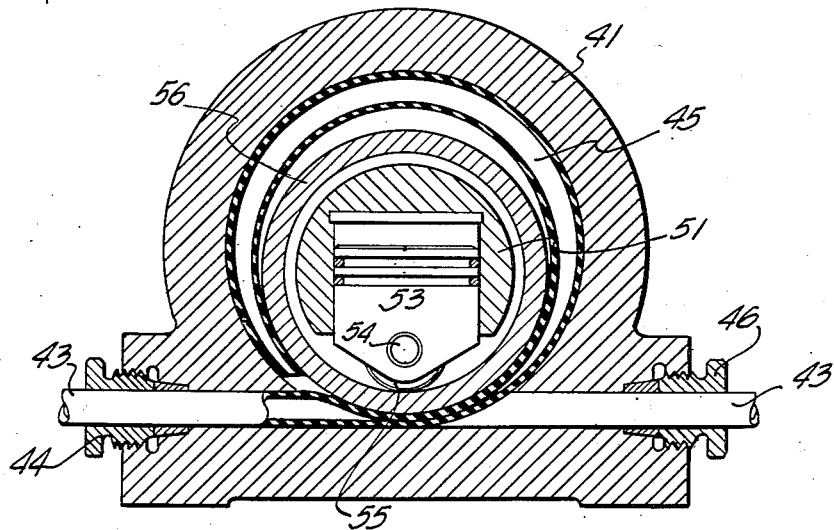

INVENTOR.
CUYLER S. McCHESNEY
BY
Benj. T. Rauber
ATTORNEY

United States Patent Office 2,826,993
Patented Mar. 18, 1958

2,826,993

FLEXIBLE HOSE FLUID PUMP

Cuyler S. McChesney, Kenmore, N. Y., assignor to Dunlop Tire and Rubber Corporation, Buffalo, N. Y., a corporation of New York Application November 23, 1953, Serial No. 393,749

9 Claims. (Cl. 103—149)

My invention relates to a pump for liquids which present difficulties when handled by a centrifugal or positive displacement pump. An example of such a fluid is rubber latex or similar dispersions.

Fliuds of this type present a problem because of the dispersed material which may coagulate and clog moving parts. They present a problem when they are to be pumped at a definite but variable rate of flow measured either by weight or by volume.

In my invention the pump comprises a housing having a cylindrical inner surface, a resilient collapsible tube entering said housing substantially tangentially and extending in a complete turn about said cylindrical surface and thence out of said housing and a pressure element pressing against said tube to collapse it at the place of pressure and rotatable about the axis of said cylindrical surface. Liquid or other fluid material supplied to the tube at the point of entry to the housing fills the tube to the place where it is collapsed, following the movement of the pressure element and, as the pressure element moves to and past the place of entry into the housing, traps the fluid and forces it forwardly as the pressure element is rotated about the cylindrical surface of the housing. Backward movement of the pumped fluid is prevented inasmuch as a succeeding quantity of fluid is trapped by the moving pressure element as it passes the place of entry and of exit of the tube.

The pressure element is preferably an element pressed toward the cylindrical inner surface of the housing and movable about said cylindrical surface without change or shift in a circumferential direction relative thereto. It may, for example, be a roll rotatable on its axis and carried on a yoke rotating on the axis of the cylindrical surface and pressed toward the cylindrical inner surface of the housing by fluid pressure or other means on the yoke. Or it may be a cylinder of less diameter than that of said inner surface pressed toward the inner surface of the housing and rolling about said inner surface without substantial circumferential shift. The pressure element collapses the tube against the inner surface of the housing at its place of contact therewith. Relative circumferential shifting of its surface on the tube is insured by suitable gearing.

The yoke is mounted on a rotatable driven shaft axially mounted in the housing, that is, co-axial with the axis of the cylindrical inner surface of the housing, by means of guides slidable radially in the shaft. It is pressed resiliently toward the cylindrical inner surface of the housing to press and collapse the tube with a pressure that may be controlled for example by a pneumatically operated piston under a pressure that may be controlled. In this way the pressure on the tube may be limited so that if the back pressure in the tube should reach a limit of safety the roll may be pressed backward toward the shaft and the pressure relieved.

The rate of pumping of the fluid may be controlled by control of the speed of rotation of the driving shaft.

The various features of the invention are illustrated, by way of example, in the accompanying drawings in which Fig. 1 is an end elevation, partly in section, of a pump embodying a preferred form of the invention;

Fig. 3 is a vertical section of another embodiment of the invention;

Fig. 5 is a vertical cross-section on line 5—5 of Fig. 4;

Figure 1:
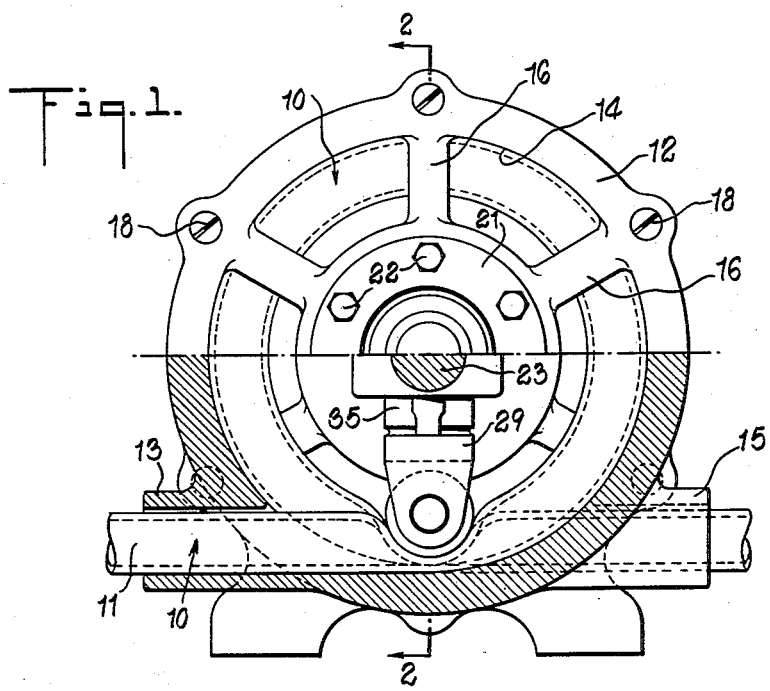
Figure 2:
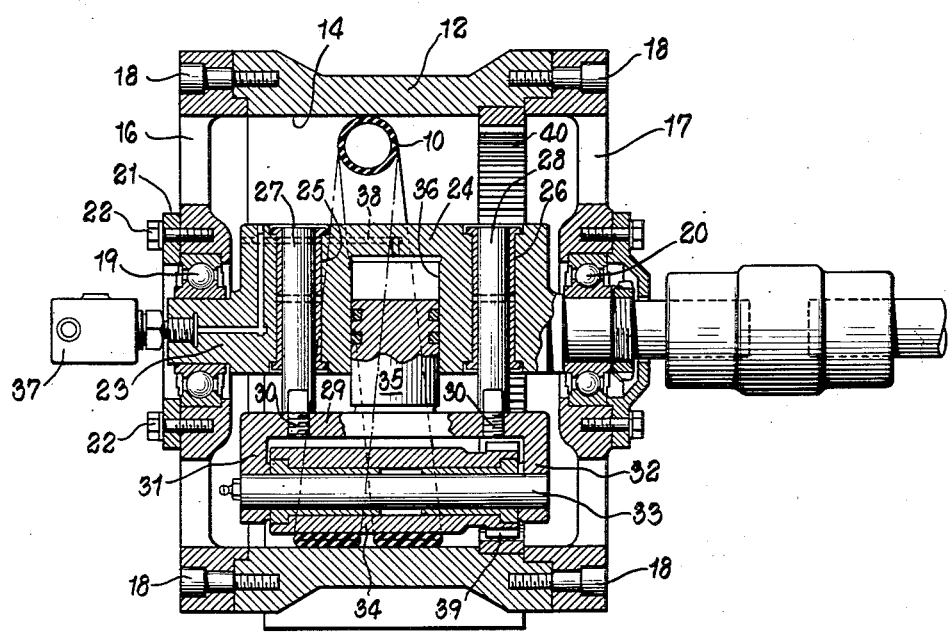
Fig. 2 is a section taken on line 2—2 of Fig. 1.

In the embodiment of the invention shown in Figs. 1 and 2, a tube 10 to which the fluid to be pumped is supplied at an inlet end 11, enters an open ended housing 12 through an opening 13 extending tangentially to a cylindrical inner surface 14 of the housing. The tube 10 then extends in a circular loop lying against the cylindrical surface of the housing to an outlet opening 15 of the housing extending tangentially to the cylindrical surface. Between the openings 13 and 15 the lengths of tubing are positioned side-by-side as shown in Fig. 2. The tubing is secured in the openings 13 and 15 so that it will not be displaced.

The housing 12 is provided at each of its open ends with a spider 16 and 17, respectively, secured in the open ends of the housing by cap screws 18, and provided at their centers with ball bearings 19 and 20 secured to the spiders by a retaining cap 21 and screws 22. A driving shaft 23 is journaled in the ball bearings 19 and 20 coaxially with the cylindrical surface 13 and is widened within the housing as at 24. The shaft 23 is provided at the widened portion with a pair of transverse guide passages 25 and 26 for a pair of guides 27 and 28 to the ends of which is attached a roller carrying yoke 29 by means of screws 30.

The yoke 29 extends lengthwise in the housing and substantially parallel to the axis of the cylindrical surface 14 and is provided at each end with an arm 31 and 32, respective in which is mounted a shaft 33 on which is rotatably mounted a roller 34. The axis of the shaft 33 and the surface of the roller 34 are preferably parallel to the cylindrical surface 14 of the housing. The yoke, and with it the roller 34, are movable radially from the axis of the shaft 23, the guides 27 and 28 that carry the yoke sliding in the guideways 25 and 26, respectively.

The yoke 29 and roller 34 are pressed resiliently outwardly toward the cylindrical surface by means of a piston 35 carried in a cylindrical recess 36 in the shaft 23 and extending into pressure contact with the yoke 29. Pressure fluid is supplied to the cylindrical recess 36 through a revolving joint 37 and a duct 38 leading therefrom through the shaft to the bottom of the recess. The pressure fluid admitted to the recess 36 forces the piston 35 outwardly and with it the yoke 29 and roller 34 with a pressure proportionate to the pressure of the fluid supplied to the recess. The pressure of the roller against the tube 10 may be regulated by regulating the pressure of the fluid admitted to the cylinder recess 36. The pressure is normally sufficient to collapse the tube 10 as indicated in Fig. 2 but will permit the roller and yoke to be displaced inwardly in case the outlet of the tube should be closed and an excessive or bursting pressure thereby be generated.

In the position shown in the drawings, the roller 34 collapses the tube between the inlet opening 13 and the outlet opening 15 thereby entrapping a quantity of fluid between these places in the tube lying against the cylindrical surface 14. As the shaft 23 rotates counterclockwise as viewed in Fig. 1, the tube opens toward the outlet and the roller, moving around the cylindrical surface and collapsing the tube as it moves, forces the fluid forwardly to the outlet while additional fluid enters the inlet end and follows the advancing roller. When a complete revolution has been accomplished and the shaft and roller are again in the position shown in Fig. 1, a succeeding quantity of fluid will have been received and trapped in the loop of the tube in position to be forced to the outlet. The rate of pumping may be controlled accurately by the speed of rotation of the shaft.

It is desirable that the roller should roll on the loop of the tube without slipping. To insure this, the roller is provided at one end with a pinion 39 rigidly secured thereon and meshing with a ring gear 40 mounted in fixed position on the interior of the housing. The pitch circle of the pinion is of the same diameter as that of the roller so that the roller rolls without slipping on the tube.

Figure 4:
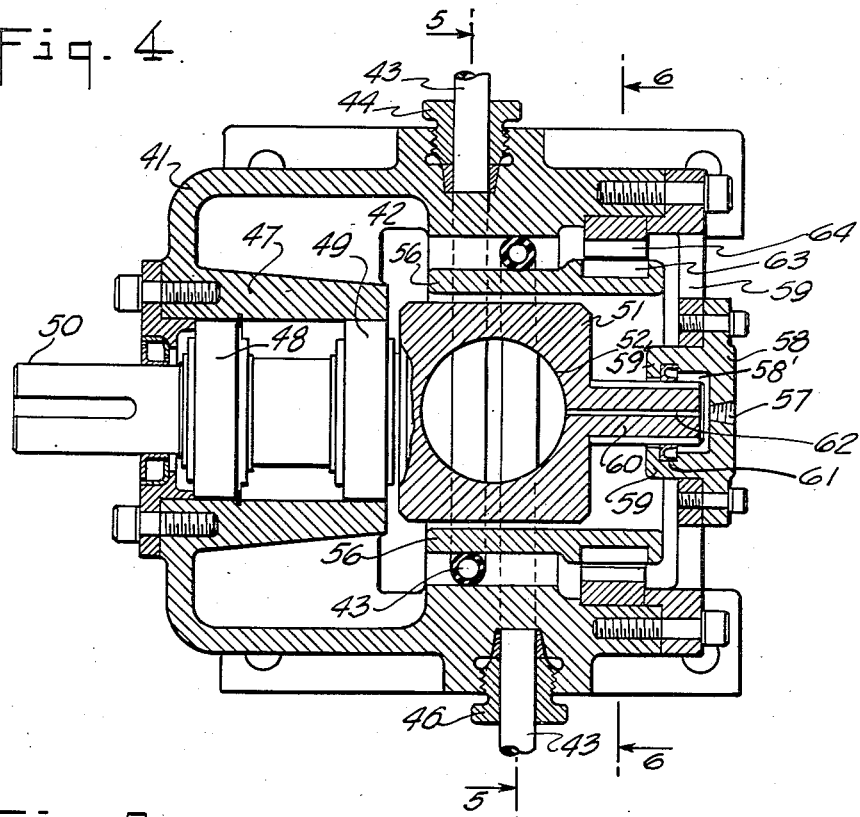
Fig. 4 is a horizontal section on line 4—4 of Fig. 3.
Figure 6:
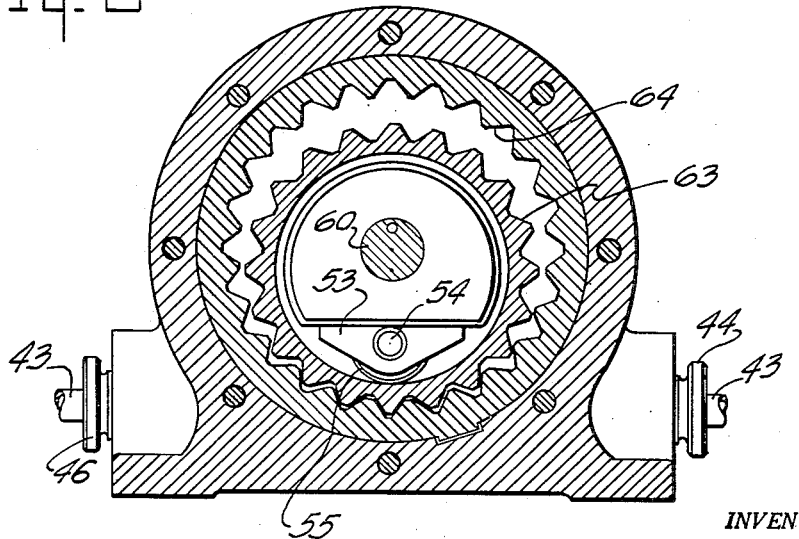
Fig. 6 is a vertical cross-section on line 6—6 of Fig. 4.

In the embodiment illustrated in Figs. 3 to 6 inclusive, a housing 41 is provided with a cylindrical inner surface 42 to support a turn of a flexible collapsible tube 43 which enters the housing through a stuffing box 44, thence passes in one complete turn, as at 45, about the cylindrical surface 42 and thence out of the housing through a second stuffing box 46. As shown in Fig. 5 the tube may enter and leave the housing tangentially to the cylindrical surface 42 and cross each other on a tangential plane as shown in Figs. 3, 4 and 5.

As shown particularly in Figs. 3 and 4, the housing is closed at one end and provided with an inward extension 47 coaxial with the axis of the cylindrical surface 42 to provide a support for a pair of spaced bearings 48 and 49. These bearings support a rotatable shaft 50 extending into the housing and enlarged at 51 within the cylindrical surface 52 to provide a hollow cylindrical recess 52 at a right angle to the axis of the shaft.

The cylindrical recess 52 is closed at one end and is provided with a slidable piston 53 extending through the opposite open end. The end of the piston 53 projecting through or out of the cylindrical recess 52 is provided with a cross shaft 54, Fig. 5, which carries a roller 55. The roller bears against a pressure ring 56 of smaller diameter than that of the inner cylindrical surface 42. Outward pressure of the piston 53 forces the roller 55 and the pressure ring 56 against the tube 45 collapsing the tube as shown in Figs. 3 and 5. As the shaft 50 is rotated and with it the piston 53, the place of pressure and collapsing of the tube moves progressively around the inner cylindrical surface 42. In each complete rotation of the shaft the point of pressure to collapse the tube 44 moves from the plane at which the tube enters and leaves the housing in a complete circle about the inner surface 42. Fluid in advance of the place of pressure is thus forced outwardly through the outward end of the tube while inlet fluid moves in to fill the space in the tube as it expands after it is released by the further movement of the piston.

Pressure is applied to the piston by means of air or other fluid under pressure. This fluid enters through an inlet opening 57 in a plate 58 supported by a spider 59 mounted on the end of the housing opposite the bearing support 47. The air or other fluid under pressure entering the inlet 57 is received in an inlet chamber 58' formed by an annular wall 59' extending into the housing and closed by an extension 60 of the shaft 50. The inlet chamber 58' is sealed to the rotating extension 60 by means of an annular air seal 61. From the inlet chamber 58' the fluid under pressure passes through a passage 62 extending axially through the extension 60 and thence to the cylindrical recess 52 between the closed end thereof and the opposite face of the piston 53. Fluid may be supplied under any pressure suitable to the conditions of operation so as to collapse the tube 43. Fluid pressure may be regulated to permit the piston 53 to be forced back by an excessive pressure at the delivery end, or by a particle passing through the tube thereby avoiding clogging.

To avoid any circumferential shift or movement of the pressure surface of the ring 56 relative to the tube 43 as the shaft 50 rotates, an external gear ring or gear 63 is mounted on an extension of the ring 56 in position to mesh with an internal gear ring 64 mounted in the housing 41. The spacing of the teeth on the gears 63 and 64 is equal so that a rolling contact of the ring 56 on the collapsed portion of the tube is provided and a circumferential shift is obviated. Accordingly, a shifting of the tube 43 is opposed by the stuffing boxes 44 and 46, and a circumferential displacement of the ring on the inner surface 42 is opposed by the gearing 63, 64.

Having described my invention, what I claim is:

1. A fluid pump which comprises a housing having a substantially cylindrical inner surface, and having a pair of bearings spaced on the axis of said cylindrical surface, a continuous, flexible, resilient hose extending into said housing, thence in one complete turn adjacent said cylindrical inner surface of said housing and thence out of said housing beyond its place of entry thereinto, a shaft rotatably mounted in said bearings, said shaft having a pair of spaced parallel guide passages placed diametrically in said shaft, a pair of supports one slidably mounted in each guide passage, a yoke mounted on the free ends of said supports, a roller rotatably mounted in said yoke parallel to the surface of said housing and a pressure element pressing said yoke outwardly to press said roller against and to flatten said hose.

2. The fluid pump of claim 1 in which said shaft has a transverse cylindrical recess and in which said pressure element comprises a piston slidable in said recess and bearing against said yoke and a passage to supply pressure fluid to said cylindrical recess.

3. A fluid pump which comprises a housing having a substantially cylindrical inner surface, a continuous, flexible, hose extending into said housing, thence in one complete turn adjacent said cylindrical inner surface and thence out of said housing, said housing having an internal gear ring, a ring within said cylindrical inner surface of smaller external diameter than the diameter of the cylindrical inner surface of said housing and of an internal diameter greater than the radius of said cylindrical inner surface to enclose the axis of said surface and having an external gear ring meshing tangentially with the internal gear ring of said housing, and an element rotatable on the axis of said cylindrical surface and having a pressure applying means to press said ring of smaller external diameter toward said cylindrical inner surface to collapse a limited extent of said hose progressively about the circumference of said turn as said element rotates.

4. The fluid pump of claim 3 in which said pressure applying means comprises a cylindrical recess in said rotatable element transverse to the axis of rotation of said element and a piston in said recess having an extension bearing against said ring.

5. The fluid pump of claim 4 in which said extension comprises a roller bearing against said ring.

6. The fluid pump of claim 4 in which said element has an axial fluid duct delivering into said cylindrical recess.

7. A fluid pump which comprises a housing having a substantially cylindrical inner surface, a continuous, flexible, resilient hose extending into said housing, thence in one complete turn adjacent said cylindrical inner surface and thence out of said housing beyond its place of entry thereinto, a rotatable roller parallel with the axis of said cylindrical surface and in position adjacent to said cylindrical surface and rotatable about its axis and about the axis of said cylindrical surface, a shaft co-axial with the axis of said cylindrical surface, means on said shaft to support said rollers in fixed axial and radially movable position on said shaft, a cylinder extending transversely on said shaft and a piston slidable in said cylinder to press said roller toward said cylindrical surface and collapse said hose, said shaft having a duct extending from one end of the shaft to the base of said cylinder to supply pressure fluid to said piston to press said roller outwardly to flatten said hose at its place of pressure by said roller as said roller rotates about the axis of said cylindrical surface.

8. The fluid pump of claim 7 having an annular ring of less diameter than the diameter of the inner surface of said housing enclosing said roller and shaft and pressed radially by said roller against said hose.

9. The fluid pump of claim 7 having a pinion fixedly mounted on said roller and a ring gear mounted within said housing and meshing with said pinion.

References Cited in the file of this patent

UNITED STATES PATENTS

| 424,944 | Allen | Apr. 8, 1890 |
| 2,018,998 | De Bakey | Oct. 29, 1935 |
| 2,314,281 | Knott | Mar. 16, 1943 |
| 2,332,157 | Mapson | Oct. 19, 1943 |
| 2,696,173 | Jensen | Dec. 7, 1954 |